United States Patent
Geelen et al.

(10) Patent No.: US 8,498,804 B2
(45) Date of Patent: Jul. 30, 2013

(54) NAVIGATION DEVICE AND METHOD FOR CONSERVING POWER

(75) Inventors: Pieter Geelen, Amsterdam (NL); Rory Jones, Amsterdam (NL)

(73) Assignee: Tomtom International B.V., Amsterdam (NL)

( * ) Notice: Subject to any disclaimer, the term of this patent is extended or adjusted under 35 U.S.C. 154(b) by 1308 days.

(21) Appl. No.: 11/907,236

(22) Filed: Oct. 10, 2007

(65) Prior Publication Data

US 2008/0167797 A1 Jul. 10, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007.

(51) Int. Cl.
*G01C 21/00* (2006.01)

(52) U.S. Cl.
USPC ............................. 701/207; 342/357.74

(58) Field of Classification Search
USPC ............... 342/357.74; 701/213, 207, 200, 701/490
See application file for complete search history.

(56) References Cited

U.S. PATENT DOCUMENTS

| | | | |
|---|---|---|---|
| 6,662,107 B2 * | 12/2003 | Gronemeyer | 701/213 |
| 7,538,722 B2 * | 5/2009 | Thandu et al. | 342/357.74 |
| 7,822,546 B2 * | 10/2010 | Lee | 701/209 |
| 2004/0048620 A1 | 3/2004 | Nakahara et al. | |
| 2005/0024277 A1 * | 2/2005 | Hanshew et al. | 343/702 |
| 2005/0096102 A1 * | 5/2005 | Mock et al. | 455/574 |
| 2008/0062105 A1 * | 3/2008 | Han et al. | 345/90 |
| 2008/0084324 A1 * | 4/2008 | Wallace et al. | 340/679 |
| 2008/0150797 A1 * | 6/2008 | Jia et al. | 342/357.06 |

FOREIGN PATENT DOCUMENTS

| | | |
|---|---|---|
| CN | 1648937 | 8/2005 |
| EP | 1348975 | 10/2003 |
| GB | 2409950 | 7/2005 |
| WO | 2007026046 | 3/2007 |

OTHER PUBLICATIONS

International Search Report issued Feb. 12, 2008 for International Application No. PCT/EP2007/008751.

* cited by examiner

*Primary Examiner* — Mark Hellner

(57) ABSTRACT

A method and device are disclosed for navigation. In at least one embodiment, the method includes determining, in a navigation device, at least one of, when an instruction for travel along a route of travel is not due to be output for a distance exceeding a distance threshold, and when no instruction for travel along the travel route is output for a period of time exceeding a time threshold; and placing the navigation device in a power conserving mode upon the determination being made. In at least one embodiment, the navigation device includes a processor to determine at least one of, when an instruction for travel along a route of travel is not due to be output for a distance exceeding a distance threshold, and when no instruction for travel along the travel route is output for a period of time exceeding a time threshold, the processor placing the navigation device in a power conserving mode upon the determination being made.

23 Claims, 7 Drawing Sheets

NAVIGATION DEVICE AND METHOD FOR CONSERVING POWER

PRIORITY STATEMENT

The following applications are being filed concurrently with the present application. The entire contents of each of the following applications is hereby incorporated herein by reference: A NAVIGATION DEVICE AND METHOD FOR EARLY INSTRUCTION OUTPUT (application Ser. No. 11/907,229) filed on even date herewith; A NAVIGATION DEVICE AND METHOD FOR ESTABLISHING AND USING PROFILES (application Ser. No. 11/907,230) filed on even date herewith; A NAVIGATION DEVICE AND METHOD FOR ENHANCED MAP DISPLAY (application Ser. No. 11/907,231) filed on even date herewith; A NAVIGATION DEVICE AND METHOD RELATING TO AN AUDIBLE RECOGNITION MODE (application Ser. No. 11/907,232) filed on even date herewith; NAVIGATION DEVICE AND METHOD FOR PROVIDING POINTS OF INTEREST (application Ser. No. 11,907,233) filed on even date herewith; A NAVIGATION DEVICE AND METHOD FOR FUEL PRICING DISPLAY (application Ser. No. 11/907,234) filed on even date herewith; A NAVIGATION DEVICE AND METHOD FOR INFORMATIONAL SCREEN DISPLAY (application Ser. No. 11/907,235) filed on even date herewith; A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR ISSUING WARNINGS (application Ser. No. 11/907,242) filed on even date herewith; A NAVIGATION DEVICE AND METHOD FOR DISPLAY OF POSITION IN TEXT READABLE FORM (application Ser. No. 11/907,241) filed on even date herewith; A NAVIGATION DEVICE AND METHOD FOR EMERGENCY SERVICE ACCESS (application Ser. No. 11/907,228) filed on even date herewith; A NAVIGATION DEVICE AND METHOD FOR PROVIDING REGIONAL TRAVEL INFORMATION IN A NAVIGATION DEVICE (application Ser. No. 11/907,240) filed on even date herewith; A NAVIGATION DEVICE AND METHOD FOR USING SPECIAL CHARACTERS IN A NAVIGATION DEVICE (application Ser. No. 11/907,239) filed on even date herewith; A NAVIGATION DEVICE AND METHOD USING A PERSONAL AREA NETWORK (application Ser. No. 11/907,238) filed on even date herewith; A NAVIGATION DEVICE AND METHOD USING A LOCATION MESSAGE (application Ser. No. 11/907,237) filed on even date herewith; A NAVIGATION DEVICE AND METHOD FOR USING A TRAFFIC MESSAGE CHANNEL (application Ser. No. 11/907,253) filed on even date herewith; A NAVIGATION DEVICE AND METHOD FOR USING A TRAFFIC MESSAGE CHANNEL RESOURCE (application Ser. No. 11/907,252) filed on even date herewith; A NAVIGATION DEVICE AND METHOD FOR QUICK OPTION ACCESS (application Ser. No. 11/907,251) filed on even date herewith; A NAVIGATION DEVICE AND METHOD FOR DISPLAYING A RICH CONTENT DOCUMENT (application Ser. No. 11/907,257) filed on even date herewith.

CO-PENDING APPLICATION

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, 60/879,529 filed Jan. 10, 2007, and 60/879,604 filed Jan. 10, 2007, the entire contents of each of which is hereby incorporated herein by reference.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device.

SUMMARY

The inventors discovered that although such navigation devices are connectable to a car charger during use, many people tend to use these devices (even within a vehicle) without such a power connection, relying on an internal battery to power the navigation device. Further, as many navigation devices are portable, such devices being used for walking navigation include no external power source and must rely on internal battery power. The inventors of the present application have further discovered that since such devices are touted as being portable, there are conflicting interests between increasing battery size and thus battery power, and increasing overall weight of the portable navigation device (which tends to occur when battery size is increased).

Thus, the inventors of the present application have developed a method to conserve battery power during use of the navigation device, thereby increasing battery life without increasing size/weight of the battery.

In at least one embodiment of the present application, a method includes determining, in a navigation device, at least one of,
  when an instruction for travel along a route of travel is not due to be output for a distance exceeding a distance threshold, and
  when no instruction for travel along the travel route is output for a period of time exceeding a time threshold; and placing the navigation device in a power conserving mode upon the determination being made.

In at least one embodiment of the present application, a navigation device includes a processor to determine at least one of,
  when an instruction for travel along a route of travel is not due to be output for a distance exceeding a distance threshold, and
  when no instruction for travel along the travel route is output for a period of time exceeding a time threshold, the processor placing the navigation device in a power conserving mode upon the determination being made.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
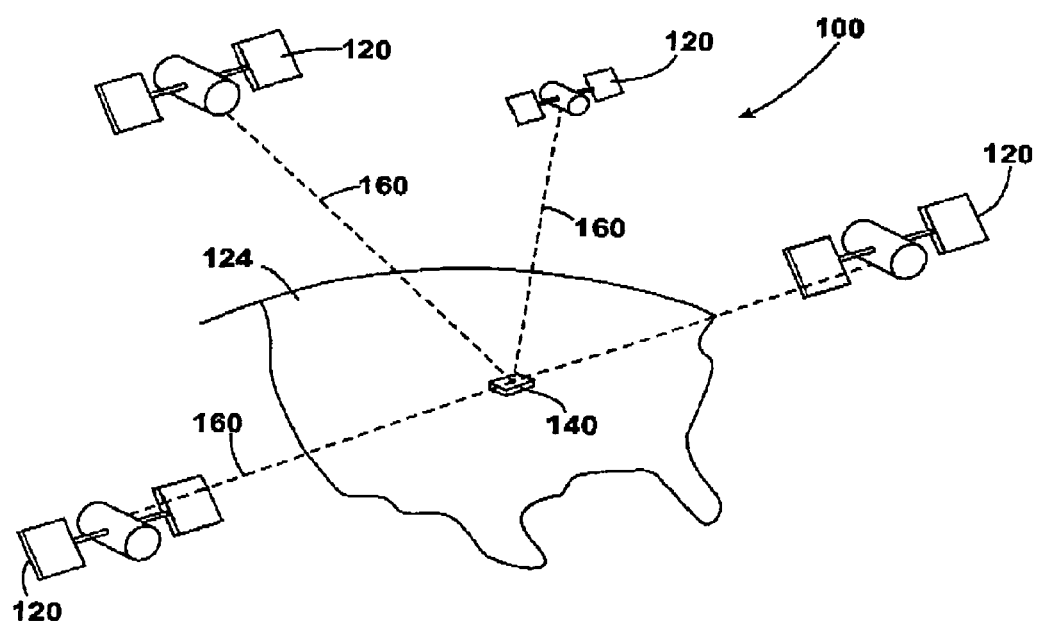
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
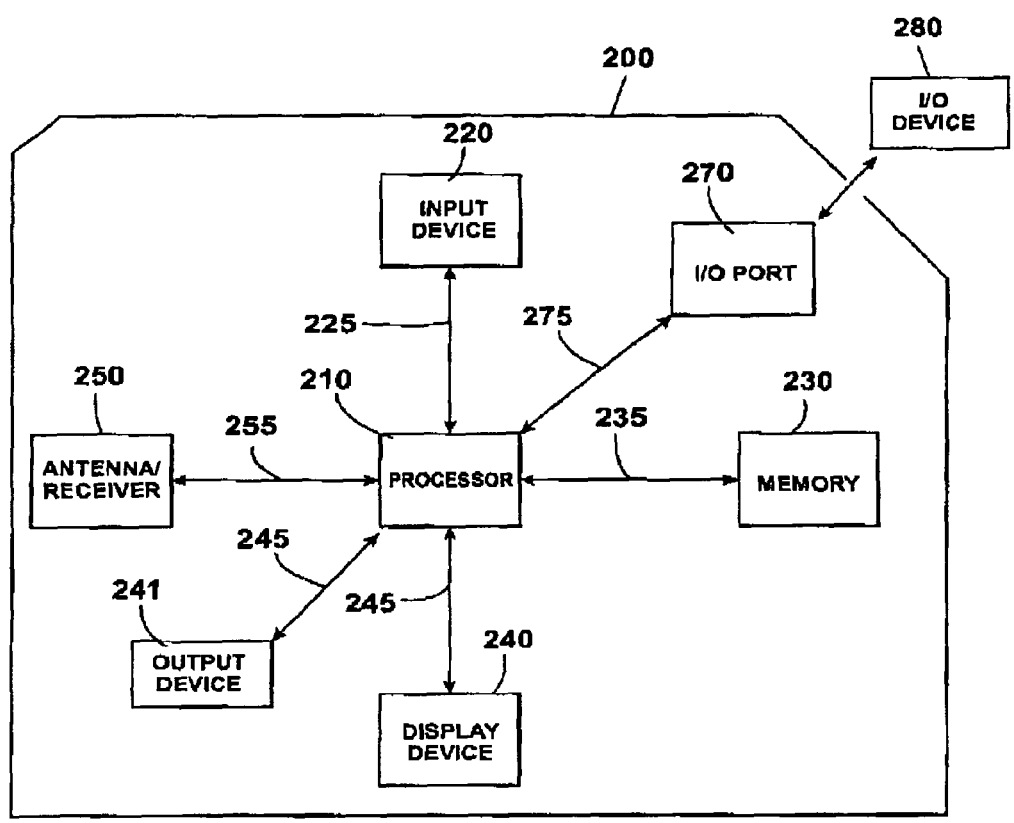
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 241 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
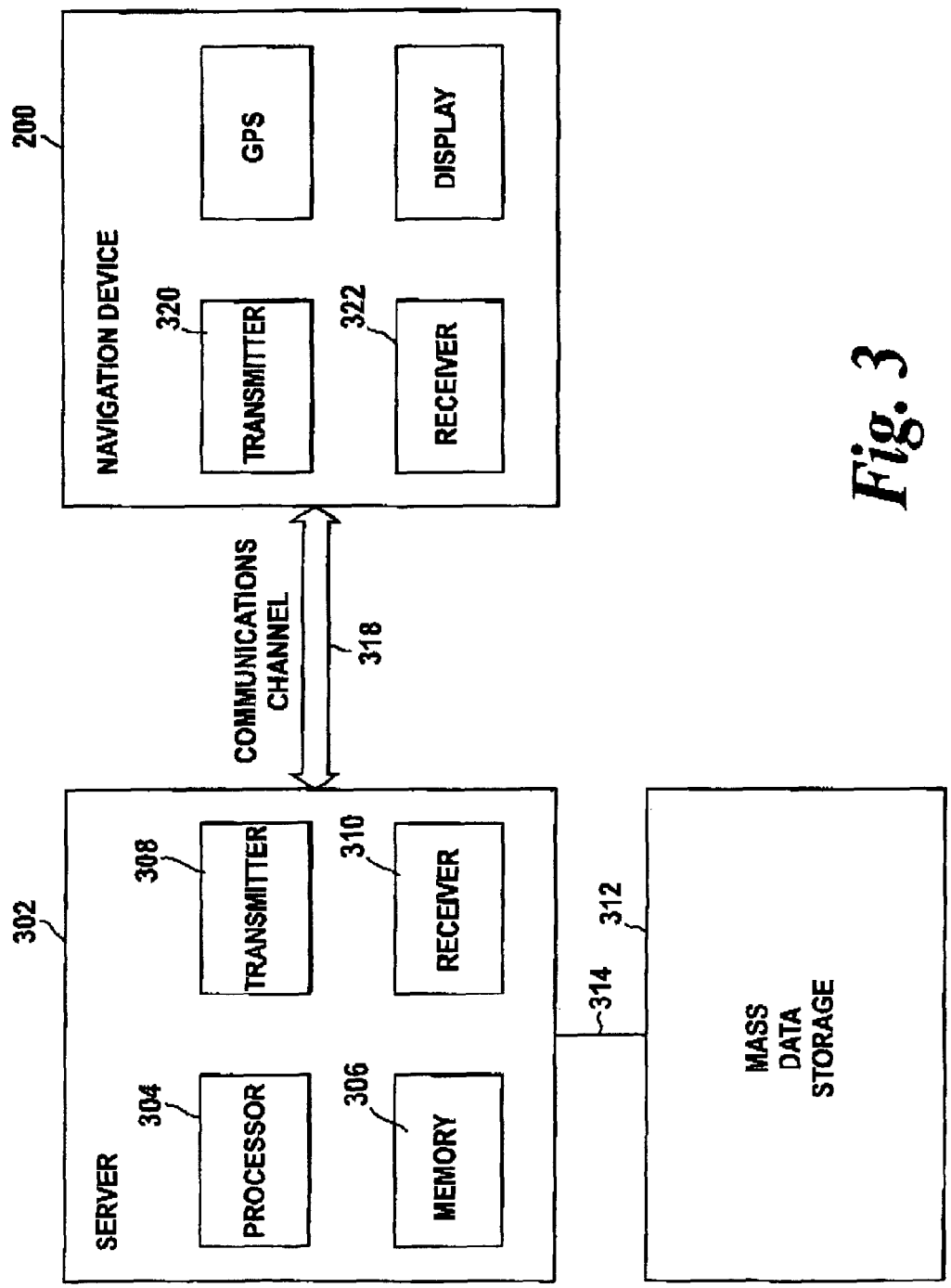
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-ROMs for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs; however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
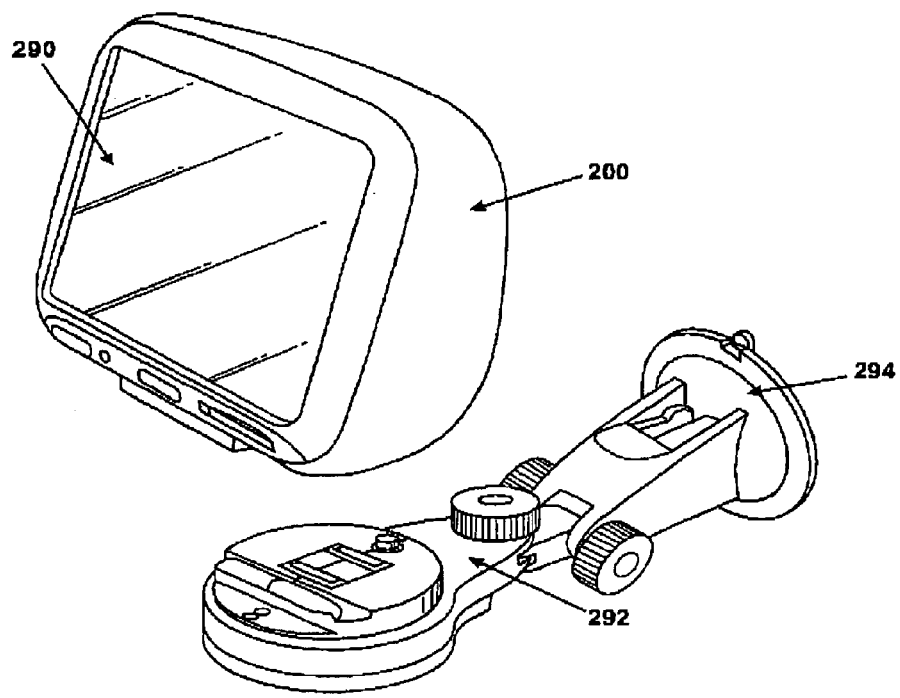
FIGS. 4A and 4B are perspective views of an implementation of an embodiment of the navigation device 200.
Figure 4B:
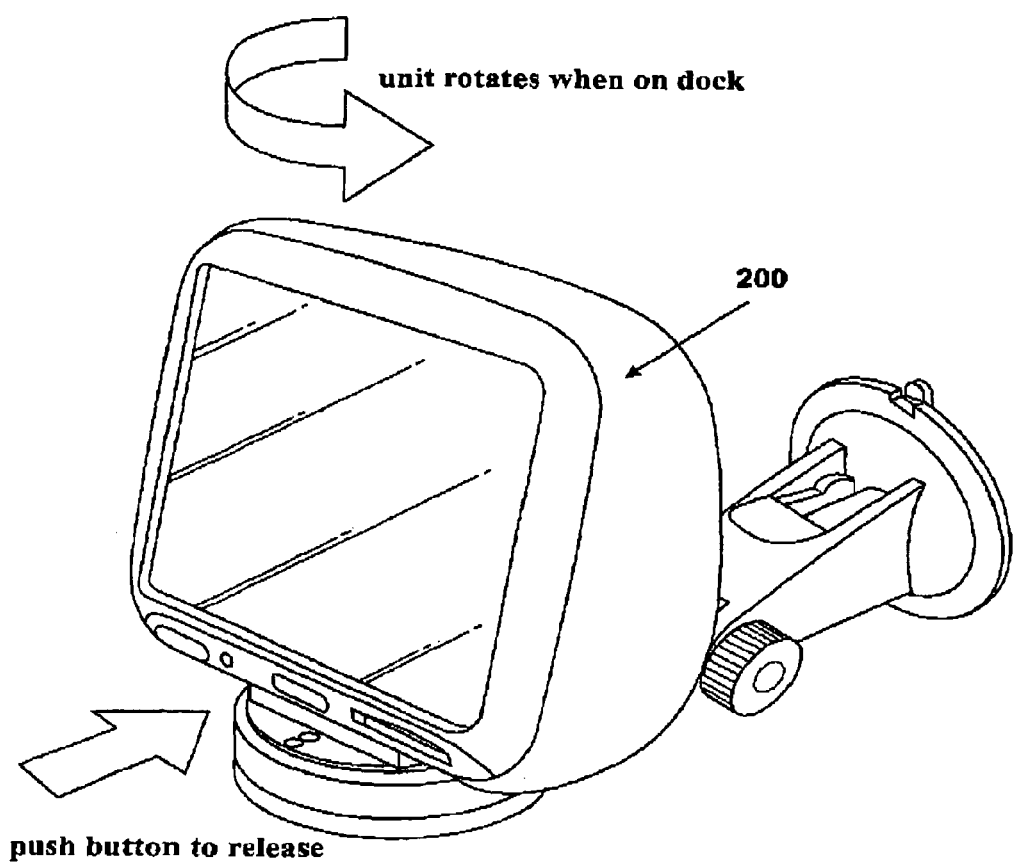

FIGS. 4A and 4B are perspective views of an actual implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc.

using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

An embodiment of the present application is directed to a method including determining, in a navigation device, at least one of, when an instruction for travel along a route of travel is not due to be output for a distance exceeding a distance threshold, and when no instruction for travel along the travel route is output for a period of time exceeding a time threshold; and placing the navigation device in a power conserving mode upon the determination being made.

In at least one other embodiment, the present application is directed to a navigation device including a processor to determine at least one of when an instruction for travel along the route of travel is not due to be output for a distance exceeding a distance threshold, and when no instruction for travel along the travel route is output for a period of time exceeding a time threshold, the processor placing the navigation device in a power conserving mode upon the determination being made.

All of the aforementioned components of FIGS. 2, 3, 4A and 4B of the navigation device 200 can be powered by either an internal power source, such as a battery for example, or via connection to an external power source (for example a vehicle battery, a home outlet, etc.). This external connection can be a direct cable or other connection between the navigation device 200 and a vehicle outlet (for providing power from the vehicle battery), and/or can be a cable or other connection between the docking station 292 and the vehicle outlet, with the docking station 292 being connected to the navigation device 200 as shown in FIG. 4B for example.

Upon the navigation device 200 being connected to the vehicle battery, no real power problems exist as long as the vehicle is running (the vehicle battery recharges itself while the vehicle is running and thus the navigation device 200 is constantly supplied with power). However, if the vehicle is stopped, or if the components (of FIG. 2 for example) of the navigation device 200 are otherwise running off the internal battery of the navigation device 200 (if the navigation device 200 is not connected to the vehicle battery while in the vehicle, if the navigation device 200 is being used in a handheld mode for walking navigation and/or for its other functions such as an MP3 player for example, etc.), the relatively small internal battery can have its power used up quickly. Such an internal battery can last, for example, about two hours in normal use and it is estimated that it will last about three hours based upon the power saving of embodiments of the present application.

For example, although a connection to a vehicle outlet can be made while the navigation device is in the vehicle, the outlets are often used for other devices and/or the connection between the navigation device 200 (or docking station 292) and the outlet of the vehicle can involve cables hanging in the user's view or across the steering wheel of the vehicle and thus, for whatever reason, a connection between the navigation device 200 (or docking station 292) and the outlet of the vehicle is often not made. Accordingly, in many instances, the navigation device 200 operates off of its internal battery power, even when used in a vehicle. Thus, the inventors of the present application have designed ways to conserve battery power. However, the power conserving can be achieved irrespective of whether the navigation device 200 is operating off of internal battery power or external vehicle battery power; the effects of the power conservation may just be greater if the navigation device 200 is operating off internal battery power.

Figure 5:
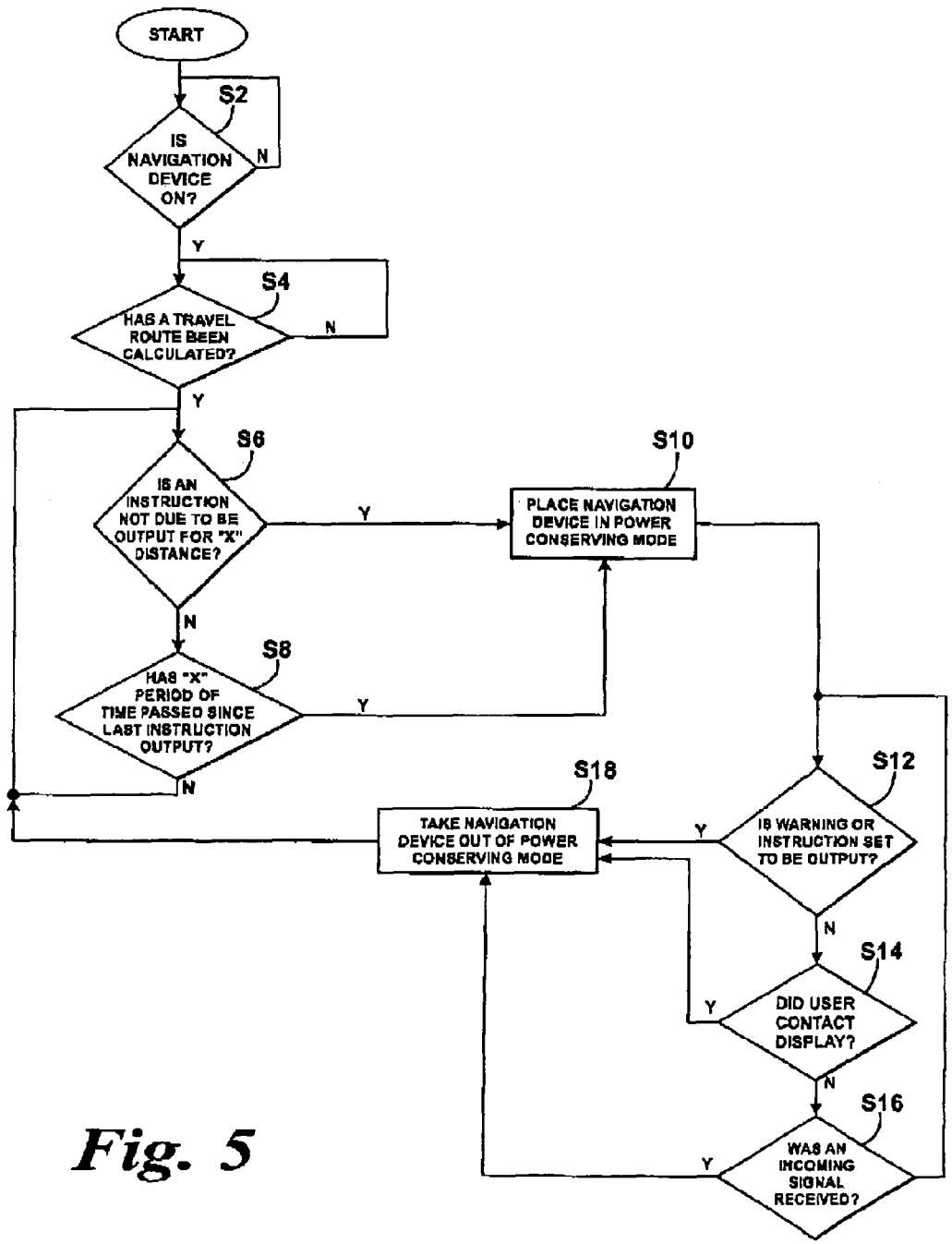
FIG. 5 illustrates an example flow chart of an embodiment of the present application.

FIG. 5 provides an illustration of one example embodiment of a method of the present application. It should be understood that this method can be used anytime the navigation device 200 is operating using internal battery power, and the method applies equally to vehicle and walking or "foot travel" navigation. Further, it is again mentioned that the power conserving can be achieved irrespective of whether the navigation device 200 is operating off of internal battery power or external vehicle battery power; the effects of the power conservation may just be greater if the navigation device 200 is operating off internal battery power.

As shown in FIG. 5, in step S2, a processor 210 of the navigation device 200 may initially determine whether or not the navigation device 200 is ON. This determination can include a determination of whether or not the navigation device 200 is operating off of internal battery power. For example, the external battery may send a signal to processor 210 to enable a determination of whether internal or external battery power is being used (the USB power may send a signal to a processor, which translates it into a gpio pin, which is then usable by the processor 210 to determine the power source). However, irrespective of whether or not this determination is made, the process steps of FIG. 5 can still continue as the power conserving steps can be achieved irrespective of whether the navigation device 200 is operating off of internal battery power or external vehicle battery power; the effects of the power conservation may just be more easily recognizable if the navigation device 200 is operating off internal battery power. If not, the process proceeds back to repeat step S2, and if so, the process moves to step S4.

Thereafter, it is determined, by the processor 210 for example, whether or not a travel route has been calculated. A travel route is typically determined in a known manner based upon an input destination location, of a desired destination of a user for example, and a GPS signal received in the GPS receiver 250 of the navigation device 200, indicating a current location of the navigation device 200. Once the travel destination has been input into the navigation device 200, either audibly or via an integrated input and display device 290 for example, a processor 210 of the navigation device 200 can then determine or calculate a route of travel in a known manner based upon map information stored in the memory 230 of the navigation device 200, the input travel destination, and a current location of the navigation device.

If a route has not been calculated in step S4, the system proceeds back to repeat step S4.

Once a route of travel has been calculated in step S4, the process proceeds to step S6 where it is determined, by processor 210 for example, whether or not an instruction for travel along the route of travel is not due to be output for a distance exceeding a distance threshold ("x distance"). Thus, for example, a threshold can be established by the processor 210 in the navigation device 200, wherein, if an instruction (for making a turn during travel along the route, for entering the highway, etc.) is not due to be output for more than, for example, 10 kilometers (or any set threshold distance), then the navigation device 200 can be placed in a power conserving mode, by processor 210 for example, as shown in step S10.

If an instruction is due to be output, the navigation device 200 remains in a normal power operating mode and proceeds to step S8 where it is determined, by processor 210 for example, whether or not no instruction for travel was output for a period of time exceeding a set time threshold. In other words, has "X" period of time passed since the last instruction was output. Again, this threshold may be any set threshold, and can be, for example, one minute. If such a period of time has passed, then a navigation device 200 may be placed in a power conserving mode, by processor 210 for example, in step S10. If not, the system may proceed back to repeat step S6.

Regarding steps S6 and S6, these steps can be determined in any order. Thus, the determination made in step S8 can be made before the determination in step S6, and vice versa, as neither is dependent upon the other.

Placing the navigation device 200 in a power conserving mode as placed in step S10 may be done in a number of different ways which conserve use of power in the navigation device 200. For example, the placing of the navigation device 200 in a power conserving mode can include at least one of relatively dimming a backlight of an integrated input and display device 290 of the navigation device 200. Further, the at least relatively dimming can include turning the backlight off to conserve power. Either of these can be done, for example, by the processor 210 controlling the supply of power from an internal battery of the navigation device 200 to a backlight of the integrated input and display device 290 for supplying light to a screen from behind the screen. In addition or alternatively, other types of power conserving can also be included, including but not limited to turning off an sd controller, turning down CPU speed, etc.

Figure 6:
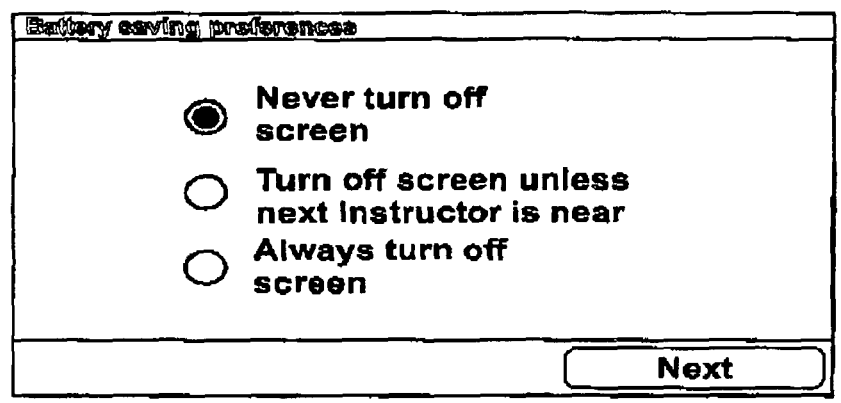
FIG. 6 illustrates an example of a preference prompt for embodiment of the present application.

In another alternative embodiment of the present application, the user can initially be displayed a screen (on the integrated input and display device 290 of the navigation device 200, for example) or otherwise prompted to select a conserving mode or battery saving preference as shown in FIG. 6 of the present application. One such preference can be to never turn the screen off, one such preference can be to turn off the screen unless a next instruction is near (via the aforementioned distance threshold or time threshold for example), or to always turn the screen off. In this context, "turn off screen" can mean at least one of at least relatively dimming a backlight of an integrated input and display device 290 of the navigation device 200, and turning the backlight off.

As such, the screen of the integrated input and display device 290 of the navigation device 200 will most likely not be totally black, it will merely be very dark. Thus, under good conditions, users will still be able to see that their navigation device 200 is still on and working, whereas under normal conditions, the screen will appear to be turned off. Furthermore, when the screen's backlight is relatively dimmed or turned off, the navigation device 200 may further stop updating the screen, thus saving more power. The screen may be updated again as soon as the backlight is turned on or removed from its relatively dim state. The updating of the screen is optional and/or can be part of the placing the navigation device 200 in a power conserving mode in step S10. Thus, the placing of the navigation device 200 in the power conserving mode may include at least one of pausing and temporarily ceasing an update of a display of an integrated input and display device of the navigation device.

As stated previously with regard to FIG. 5, the navigation device 200 may be placed in a power conserving mode in step S10. Thereafter, the navigation device 200 may be taken out of the power conserving mode upon other conditions taking place. For example, in step S12, it is determined, by the processor 210 for example, whether or not a warning (such as an emergency warning for example, as stated in any one of applications entitled A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR ISSUING WARNINGS (application Ser. No. 11/907,242) filed on even date herewith, the entire contents of each of which are incorporated herein by reference) or an instruction is set to be output to an integrated input and display device 290 of the navigation device 200, wherein the determination of the instruction may be within at least one of a distance less than a second distance threshold and/or a time less than a second time threshold, for example. If either the warning or instruction is set to be output as determined by the processor 210 in step S 12, then the process moves to step S18 wherein the navigation device 200 is taken out of the power conserving mode, for example by turning the backlight on and/or removing the relatively dim state of the backlight, for example.

If the answer to the question posed in step S12 is no, the process moves to step S14 where it is determined, by the processor 210 for example, whether or not the user contacted the integrated input and display device 290 of the navigation device 200. For example, it may be determined whether or not the user tapped on the screen of the integrated input and display device 290. If so, the navigation device 200 is taken out of the power conserving mode in step S18, and if not, the process moves to step S16.

In Step 816, it is determined, by the processor 210 for example, whether or not an incoming signal was received, such as an incoming message signal, an incoming phone signal, etc., wherein the incoming message signal can be any type of message signal, such as a buddy message, and 8MS message, an email message, etc. If so, then the navigation device 200 is taken out of the power conserving mode in step S 18, and if not, then the process moves back to step S 12 to determine if any of the four determinations (noting that two determinations are made in Step S 12) have been met, for which the navigation device 200 should be taken out of the power conserving mode in step S18.

Regarding steps S12, S14 and S16, and the four determinations made therein, these steps can be determed by the processor 210 in any order. Thus, the determination made in step S14 can be made before any of the determinations in steps S12 and S16, the determination made in step S16 can be made before any of the determinations in steps S12 and S14, etc. and vice versa, as none are dependent upon the other. Further, although discussed together in step S12, the warnings and instructions can also be determined separately by the processor 210, and are only grouped together for the sake of brevity.

As shown in FIG. 6, the user may be optionally prompted with preferences regarding setting the navigation device 200 in a power conserving mode. This navigation device 200 may operate so as not to provide the user with such preferences, and can merely enter the power conserving mode upon any of the conditions of step S6 and S8 of FIG. 5 being met for example. However, if the user is provided with a preference as shown in FIG. 6, and selects the "never turn off screen" preference, then the process of the steps of FIG. 5 may be skipped and the navigation device 200 remains in a normal mode. Similarly, if the "always turn off screen" preference is selected, the screen may be always turned off during use in a moving map mode, namely after a travel route has been calculated. However, the system can optionally utilize the steps of S12, S14, and S16 to take the navigation device 200 out of the power conserving mode for at least a short period of time.

Thus, as shown in FIG. 5, a plurality of selectable power conserving mode options can be displayed to the user, wherein the navigation device 200 is placed in the selected mode upon the determination being made. It should be noted that these modes are not limited to those shown in FIG. 6 and can include different selectable aspects of power conservation including, for example, turning the backlight off, dimming the backlight of the integrated input and display device 290, etc.

In addition, the user may be provided with feedback, upon placing the navigation device 200 in a power conserving mode. For example, it may be difficult for the user to determine, when viewing the navigation device 200 under normal conditions, whether the navigation device 200 is in a power conserving mode or whether the navigation device 200 has been turned off. Thus, at least one of visual and audible feedback can be provided to the user to let the user know that the navigation device 200 is in a power conserving mode. Such feedback can include at least one of a blinking LED on the integrated input and display device 290 of the navigation device 200 for example, a periodically output audible message, etc.

Additional parameters can be utilized in determining whether or not to place the navigation device 200 in a power conserving mode. For example, once the route of travel is calculated, the processor can determine whether or not the route of travel meets a minimum travel distance or time, namely whether or not the route of travel exceeds a distance for time threshold, such as, for example, thirty miles or thirty minutes. If not, then it is merely determined that this is a "short" trip wherein the power conserving mode need not be enabled.

Additionally, the user may be prompted to save battery power. For example, the user may be requested to dim the screen (namely relatively dim or turn off the backlight of the integrated input and display device 290) upon a next instruction being more than a certain distance or a certain time away (for example, five miles or five minutes). Thus, the user can select whether or not to enter the power conserving mode. As such, the placing in the power conserving mode may only occur upon the determination being made and subsequent to receipt of an indication of a selection by a user, to enter the power conserving mode. The selection may be received, by the processor 210 for example, at least one of before and after the determination is made, and subsequent to a prompt.

Implementation of the process shown in FIG. 5 can be done by a processor 210 of the navigation device 290 in at least one other embodiment of the present application. For example, in at least one embodiment, a navigation device 200 can include a processor 210 to determine at least one of, when an instruction for travel along a route is not due to be output for a distance exceeding a distance threshold, and when no instruction for travel along the travel route is output for a period of time exceeding a time threshold, the processor 210 placing the navigation device 200 in a power conserving mode upon the determination being made. Again, the processor 210 can merely send the signal to turn off a relatively dim display state of the backlight of the integrated input and display device 290, of the navigation device 200. Further, the processor 210 can monitor the various conditions of step S6 and S8, and once placed in a power conserving mode, the processor can monitor the various conditions of step S12, step S14, and step S16 of FIG. 5. Thus, the processor 210 can control at least one of a relative dimming of the backlights and a turning of the backlight, of the integrated input and display device 290 of the navigation device 200, completely off.

Further, the navigation device 200 may include an output device 241 to provide feedback to a user of the navigation device 200, upon the processor 210 placing the navigation device 200 in a power conserving mode. The feedback may be at least one of visual and audible, including a blinking LED on an integrated input and display device 290 of the navigation device 200 and/or outputting, via an output device 241, such as the speaker of the navigation device 200 for example, an audible message periodically, etc.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
   determining, in a navigation device, at least one of,
   when an instruction for travel along a route of travel is not due to be output for a distance exceeding a distance threshold, and when no instruction for travel along the travel route is output for a period of time exceeding a time threshold; and
   placing the navigation device in a power conserving mode upon the determination being made;
   wherein the method further comprises taking the navigation device out of the power conserving mode upon at least one of:
   determining that a warning is to be output to an integrated input and display device of the navigation device;
   determining an indication of contact on the integrated input and display device of the navigation device; and
   determining receipt of an incoming signal.

2. The method of claim 1, wherein the placing of the navigation device in a power conserving mode includes at least relatively dimming a backlight of an integrated input and display device of the navigation device.

3. The method of claim 2, wherein the at least relatively dimming includes turning the backlight off.

4. The method of claim 1, wherein the incoming signal includes at least one of an incoming message signal, and an incoming phone call signal.

5. The method of claim 1, further comprising:
   displaying a plurality of selectable power conserving mode options to a user of the navigation device, wherein the navigation device is placed in the selected power conserving mode upon the determination being made.

6. The method as claimed in claim 1, further comprising:
   providing feedback to a user of the navigation device, upon placing the navigation device in a power conserving mode.

7. The method as claimed in claim 6, wherein the feedback is at least one of visual and audible.

8. The method as claimed in claim 6, wherein the feedback includes at least one of a blinking LED on an integrated input and display device of the navigation device and a periodically output audible message.

9. The method of claim 1, wherein the placing of the navigation device in the power conserving mode includes at least one of pausing and temporarily ceasing an update of a display of an integrated input and display device of the navigation device.

10. The method of claim 1, wherein the placing in the power conserving mode only occurs upon the determination being made and subsequent to receipt of an indication of a selection by a user, to enter the power conserving mode.

11. The method of claim 10, wherein the selection is received at least one of before and after the determination is made, and subsequent to a prompt.

12. A computer readable medium including program segments for, when executed on a processor of a navigation device, causing the navigation device to implement the method of claim 1.

13. A navigation device, comprising:
   a processor to determine at least one of,
   when an instruction for travel along a route of travel is not due to be output for a distance exceeding a distance threshold, and when no instruction for travel along the travel route is output for a period of time exceeding a time threshold, the processor placing the navigation device in a power conserving mode upon the determination being made;
   wherein the processor is further useable to take the navigation device out of the power conserving mode upon the processor at least one of:
   determining that a warning is to be output to an integrated input and display device of the navigation device;
   determining an indication of contact on the integrated input and display device of the navigation device; and
   determining receipt of an incoming signal.

14. The navigation device of claim 13, wherein the placing of the navigation device in a power conserving mode includes the processor controlling at least a relative dimming of a backlight of an integrated input and display device of the navigation device.

15. The navigation device of claim 14, wherein the at least relative dimming includes the processor controlling turning the backlight off.

16. The navigation device of claim 13, wherein the incoming signal includes at least one of an incoming message signal, and an incoming phone call signal.

17. The navigation device of claim 13, further comprising:
an integrated input and display device to display a plurality of selectable power conserving mode options to a user of the navigation device, wherein the navigation device the processor is further useable to place the navigation device in the selected power conserving mode upon the determination being made by the processor.

18. The navigation device as claimed in claim 11, further comprising:
an output device to provide feedback to a user of the navigation device, upon the processor placing the navigation device in a power conserving mode.

19. The navigation device as claimed in claim 18, wherein the output device is at least one of a visual and audible output device and wherein the feedback is at least one of visual and audible.

20. The navigation device as claimed in claim 18, wherein the output device includes at least one of an integrated input and display device and an audible output device and wherein the feedback includes at least one of a blinking LED on the integrated input and display device of the navigation device and an audible message periodically output via the audible output device.

21. The navigation device of claim 13, wherein the processor placing the navigation device in the power conserving mode includes the processor at least one of pausing and temporarily ceasing an update of a display of an integrated input and display device of the navigation device.

22. The navigation device of claim 13, wherein the processor placing the navigation device in the power conserving mode only occurs upon the determination being made and subsequent to receipt, by the processor, of an indication of a selection by a user, to enter the power conserving mode.

23. The navigation device of claim 22, wherein the selection is received by the processor at least one of before and after the determination is made, and subsequent to a prompt.

* * * * *

UNITED STATES PATENT AND TRADEMARK OFFICE
CERTIFICATE OF CORRECTION

PATENT NO. : 8,498,804 B2  
APPLICATION NO. : 11/907236  
DATED : July 30, 2013  
INVENTOR(S) : Pieter Geelen and Rory Jones Page 1 of 1

It is certified that error appears in the above-identified patent and that said Letters Patent is hereby corrected as shown below:

On the Title Page, item [60]

Related U.S. Application Data, should read as follows:

Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, and provisional application No. 60/879,604, filed on Jan. 10, 2007.

Signed and Sealed this  
Twenty-fifth Day of August, 2015

Michelle K. Lee  
*Director of the United States Patent and Trademark Office*

UNITED STATES PATENT AND TRADEMARK OFFICE
CERTIFICATE OF CORRECTION

PATENT NO. : 8,498,804 B2
APPLICATION NO. : 11/907236
DATED : July 30, 2013
INVENTOR(S) : Pieter Geelen and Rory Jones Page 1 of 1

It is certified that error appears in the above-identified patent and that said Letters Patent is hereby corrected as shown below:

On the Title Page, item [60]

Related U.S. Application Data, should read as follows:

Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, and provisional application No. 60/879,601, filed on Jan. 10, 2007.

This certificate supersedes the Certificate of Correction issued August 25, 2015.

Signed and Sealed this
Twenty-third Day of February, 2016

Michelle K. Lee
*Director of the United States Patent and Trademark Office*